Patented July 2, 1929.

1,719,180

UNITED STATES PATENT OFFICE.

DAVID L. JACOBSON, OF PITTSBURGH, PENNSYLVANIA, ASSIGNOR TO THE KOPPERS COMPANY, A CORPORATION OF PENNSYLVANIA.

GAS-PURIFICATION PROCESS.

No Drawing.     Application filed November 5, 1926.   Serial No. 146,571.

This invention relates to the purification of gas, more particularly fuel gas such as coal gas, coke-oven gas, water gas, and the like, or air, from hydrogen sulphide and analogous impurities.

My invention relates more particularly to processes of gas purification involving the circulation of an alkaline liquid through an absorption and an actification stage.

An object of my invention is to provide a novel absorptive liquid which can be employed in such process and by means of which the purification of gas and the actification of said liquid can be efficiently and economically effected.

A further object of my invention is to provide a process in which the necessity of suspending insoluble metallic compound in the alkaline liquid is avoided.

A further object of my invention is to provide a process for recovering sulphur absorbed from the gas in elemental form, uncontaminated by foreign insoluble material.

My invention has for further objects such other operative advantages or results as may hereinafter be found to obtain.

As absorptive agents for gas purification, I use alkaline solutions containing compounds of metals whose sulphides are substantially insoluble in water but soluble in alkaline solution and/or solutions of alkali metal sulphides (as, for example, a solution of sodium or ammonium sulphide or polysulphide). Among metals of this character are especially to be noted those of the so-called "tin group" of qualitative analysis, embracing primarily arsenic, antimony and tin. Also included within this characterization are molybdenum, vanadium, tungsten, germanium, uranium, iridium, bismuth, mercury, rhodium, indium, gold and platinum. However, I prefer to use the three metals of the tin group by reason of their cheapness and availability and, of these, I prefer to use arsenic, as having certain advantages over the others with respect to gas purification. While I will give examples of the use of arsenic hereinbelow, it should be understood that my invention is applicable to the use of the other metals herein given, with due respect to their divergences in the matters of chemical combination, atomic weights, and the like.

I may use various soluble compounds of these metals, but I prefer to use compounds in which the metal is present in the anion radical thereof, for example, sodium arsenite, and the like. Moreover, I do not limit myself to the use of an arsenite as compared with an arsenate, or to any other valence state of the metal in combination.

I have found that alkaline solutions containing these materials are capable of absorbing hydrogen sulphide and can be actified by heat, by aeration or the like, in such manner as to liberate absorbed sulphur in elemental form and to regenerate the liquid for further use. Accordingly, I recirculate a solution of this character through an absorption stage in contact with the impurity-laden gas and through an actification or regeneration stage in the usual manner, preferably removing the sulphur liberated in the actification stage before returning the solution to the absorption stage.

While the actification of the fouled solution after contact with the gas may be accomplished by heating it, I prefer to accomplish the actification by means of aeration. Furthermore, I prefer to aerate the solution with finely comminuted air whereby a flotation of the sulphur may be effected. With regard to the strength of my solutions, taking arsenic as the example, I prefer to use solutions containing up to 1% of arsenic considered as $As_2O_3$. The alkalinity of my solutions may be varied considerably, but I prefer to use enough alkali to effect a rapid and efficient absorption of hydrogen sulphide from the gas being purified, even in the presence of other acidic constituents in the gas; this result may require as much as 3% total alkalinity, or even more.

I may variously prepare my solutions, but, ordinarily, I prefer to start with an acid of the metal to be used, for example, arsenous acid, and to dissolve a material liberating this in an alkaline solution, for example, a solution of sodium carbonate or hydroxide, or I may add an alkali metal salt of such an acid directly, for example, sodium arsenite. During the performance of my invention, additions of such materials and of alkali must be made in order to account for mechanical or other losses and to maintain the desired strength of the solution.

If the arsenic that is present in arsenous acid in trivalent form is oxidized, or goes into the pentavalent form, as in arsenic acid, the solution may inherently become neutral, and when sulphided may even become acid, so that in such case alkalinity of the solution does not need to be maintained even though alkali is added to compensate for losses.

While I have described my invention with respect to the use of sodium as the alkaline element, other alkali metals, for example, potassium and ammonium, may be employed after the well-known practice of the art.

My invention is not limited to the purification of fuel gas for it may be applied to the purification of waste gases or air, for example, the so-called "actifier air" from the sodium carbonate liquid purification process described and claimed in my U. S. Letters Patent No. 1,390,037, of Sept. 6, 1921.

In my invention, I accomplish the purification of gas with a solution rather than with a troublesome suspension but I obtain the fixation of sulphur as such, which has heretofore been possible only when suspensions were employed.

A further advantage of the use of my solution in comparison with a suspension, as, for example, an alkaline suspension of iron oxide, resides in the fact that the sulphur removed from the system is not contaminated with entrained foreign insoluble material. This is important, both with respect to the quality of the sulphur and to the necessity of preventing unnecessary losses of a suspended material.

While I have described my invention hereinabove with respect to a particular example or embodiment, it may be variously practiced and embodied within the scope of the following claims.

I claim as my invention:

1. The process of purifying gas by removing therefrom impurities comprising sulphur compounds which comprises washing the gas with a solution containing an alkali metal compound of a metal the sulphide of which is soluble in alkali-metal sulphide solution.

2. The process of purifying gas by removing therefrom impurities comprising sulphur compounds which comprises washing the gas with an alkaline solution of a compound of a metal of the tin group.

3. The process of purifying gas by removing therefrom impurities comprising sulphur compounds which comprises washing the gas with a solution of an alkali and a compound of arsenic.

4. The process of removing hydrogen sulphide from gas which comprises washing the gas with a solution of an alkali metal arsenite.

5. The process of purifying gas by removing therefrom impurities comprising sulphur compounds which comprises washing the gas with a solution of an alkali-forming metal salt of an acid of a metal of the tin group.

6. The process of purifying gas by removing therefrom impurities comprising sulphur compounds which comprises washing the gas with a solution of an alkali-forming metal salt of an acid of arsenic.

7. The process of purifying gas by removing therefrom impurities comprising sulphur compounds which comprises washing the gas with a solution of a sodium salt of an acid of arsenic.

8. The process of purifying gas by removing therefrom impurities comprising sulphur compounds which comprises washing the gas with a solution of an arsenite of sodium.

9. The process of purifying gas by removing therefrom impurities comprising sulphur compounds which comprises washing the gas with a solution containing an alkali metal compound of a metal the sulphide of which is soluble in alkali-metal-sulphide solution, effecting the liberation of absorbed sulphur and using the solution for further gas purification.

10. The process of purifying gas by removing therefrom impurities comprising sulphur compounds which comprises washing the gas with an alkaline solution containing a compound of a metal the sulphide of which is soluble in alkali-metal-sulphide solution, effecting the liberation of absorbed sulphur, removing said sulphur, and using the solution for further gas purification.

11. The process of purifying gas by removing therefrom impurities comprising sulphur compounds which comprises scrubbing the gas with a solution containing an alkali metal compound of a metal the sulphide of which is soluble in alkali-metal-sulphide solution and regenerating the solution after contact with the gas for further use.

12. The cyclic process of gas purification which comprises recirculating an alkaline solution containing a compound of a metal the sulphide of which is soluble in alkali-metal-sulphide solution over the flowing gas and through an actification stage.

13. The process of regenerating an alkaline solution of a compound of a metal the sulphide of which is soluble in alkali-metal-sulphide solution, said alkaline solution having been fouled by previous contact with hydrogen sulphide-laden gas, which comprises aerating it.

14. The process of regenerating an alkaline solution of a compound of a metal the sulphide of which is soluble in alkali-metal-sulphide solution, said alkaline solution having been fouled by previous contact with hydrogen sulphide-laden gas, which comprises aerating it in such manner as to cause the flotation of the liberated sulphur.

15. The process of regenerating an alkaline solution of a compound of a metal the sulphide of which is soluble in alkali-metal-sulphide solution, said alkaline solution having been fouled by previous contact with hydrogen sulphide-laden gas, which comprises aerating it with finely comminuted air.

16. The process of purifying gas by removing therefrom impurities comprising sulphur compounds which comprises washing the gas with a solution of an alkali forming metal compound of arsenic.

17. The process of purifying gas by removing therefrom impurities comprising sulphur compounds which comprises washing the gas with a solution containing an alkali forming metal and arsenic.

18. The cyclic process of purifying gas by removing therefrom impurities comprising sulphur compounds which comprises recirculating a solution of an alkali forming metal compound of arsenic over the flowing gas for removal of said impurities and through an actification stage where it is regenerated for further use.

19. The cyclic process of purifying gas by removing therefrom impurities comprising sulphur compounds which comprises recirculating a solution containing an alkali forming metal and arsenic over the flowing gas for removal of said impurities and through an actification stage where it is regenerated for further use.

20. The cyclic process of purifying gas by removing therefrom impurities comprising sulphur compounds which comprises recirculating a solution of an alkali and an arsenic compound over the flowing gas for removal of said impurities and through an actification stage where it is regenerated for further use.

21. The cyclic process of purifying gas by removing therefrom impurities comprising sulphur compounds which comprises recirculating a solution containing an arsenite of sodium over the flowing gas for removal of said impurities and through an actification stage where it is regenerated for further use.

22. The process of purifying gas by removing therefrom impurities comprising sulphur compounds which comprises subjecting the gas to the action of a purifying agent comprising an arsenic compound for the removal of said impurities, effecting a regeneration of said purifying agent and using it for further purification of gas.

In testimony whereof, I have hereunto subscribed my name this 3rd day of November, 1926.

DAVID L. JACOBSON.